United States Patent [19]
Layes et al.

[11] Patent Number: 6,038,394
[45] Date of Patent: Mar. 14, 2000

[54] CONDITION HANDLING USING SCRIPT INTERPRETERS

[75] Inventors: Jonathan Layes, Ottawa; Yong Chen, Nepean, both of Canada

[73] Assignee: Loran Network Management Ltd., Bridgetown, Barbados

[21] Appl. No.: 09/004,494

[22] Filed: Jan. 8, 1998

[30] Foreign Application Priority Data

Jan. 10, 1997 [CA] Canada ................................. 2194848

[51] Int. Cl.[7] ...................................................... G06F 9/45
[52] U.S. Cl. ............................................................ 395/701
[58] Field of Search ............................................. 395/701

[56] References Cited

U.S. PATENT DOCUMENTS

| 5,210,876 | 5/1993 | Uchida | 395/700 |
|---|---|---|---|
| 5,367,685 | 11/1994 | Gosling | 395/707 |
| 5,381,547 | 1/1995 | Flug et al. | 395/685 |
| 5,404,528 | 4/1995 | Mahajan | 395/650 |
| 5,469,574 | 11/1995 | Chang et al. | 395/702 |
| 5,675,804 | 10/1997 | Sidik et al. | 395/705 |
| 5,768,593 | 6/1998 | Walters et al. | 395/705 |

OTHER PUBLICATIONS

"Service Interface that Supports Simple Network Management Protocol", IBM Technical Bulletin, vol. 35, No. 4A, 1992, pp. 182–186.

Inoue et al. Method of controlling a line computer for implementing a relocated compiled library program. European Patent Application, Mar. 1995.

*Primary Examiner*—Eric W. Stamber
*Assistant Examiner*—Wei Zhen
*Attorney, Agent, or Firm*—Pascal & Associates

[57] ABSTRACT

A hybrid method is described that allows for the combination of both source-compiled and source-interpreted code in the execution of computer programs. While traditional practice has dictated otherwise, code does not need to be either solely interpreted or solely compiled.

2 Claims, No Drawings

CONDITION HANDLING USING SCRIPT INTERPRETERS

BACKGROUND OF THE INVENTION

Computer software consists of a series of instructions that can be interpreted by a machine. Two methods are presently used to allow a computer to execute the instructions embedded in software. The instructions can be converted to machine instructions, which can be executed at the hardware logic-gate level, and stored prior to execution through a method called compilation. Typical methods of compilation are described by Dodson, in U.S. Pat. No. 4,330,822 and by Beckler, in U.S. Pat. No. 4,309,756. Alternatively, the instructions may be executed by a process, called an interpreter, which parses source instructions into machine language actions during execution. Bourne, in U.S. Pat. No. 4,787,035, describes one example of such an interpreter.

While both techniques are popular, each has associated disadvantages. After source instructions are compiled, modifying and updating the relevant instructions becomes very difficult. Alternatively, the use of interpreters involves a considerable amount of overhead at the time of execution. Interpreters also allow for easy viewing of the source code instructions that might not be desired if the instructions are being used in proprietary applications.

Previous software applications have been developed that implement the use of inline scripts to accomplish these very specific tasks. "Inside Macintosh", Vol I–III, published by Apple Computers, describes a method to describe graphical objects using script interpreters.

In the field of network management, methods are employed to discover the existence of devices in computer networks. Internet IETF documents RFC 1067, RFC 832, and RFC 844 describe methods, namely SNMP and DNS, which are used to obtain tables containing network nodes in the vicinity of the node being queried. Such methods are described in more detail by Wu, in U.S. Pat. No. 5,185,860. Existing commercial implementations to discover network components use compiled software to accomplish tasks.

SUMMARY OF THE INVENTION

A method is disclosed that provides a general solution to condition handling in computer programs. A "condition" in the context of this invention is defined to be any fixed or transient state in a process that can be tested against another state. In a typical compiled computer program, conditions are processed using a sequence of tests and corresponding actions in the machine's native hardware language. In a typical interpreted computer program, all instructions, including tests for conditions, are processed inside a virtual machine or interpreter.

The present invention provides a hybrid method that allows for the combination of both source-compiled and source-interpreted code in the execution of computer programs. While traditional practice has dictated otherwise, code does not need to be either solely interpreted or solely compiled.

Thus in one embodiment this invention provides a method of writing software comprising:
a) providing a compiled code;
b) providing logic in the compiled code that causes it to seek to perform some operation for which no compiled code is provided; and
c) providing interpreted code that is invoked to perform one or more operations for which no compiled code is provided.

In a preferred embodiment, the method is performed in a CPU with memory interfaced to a data communications network, and the CPU and memory operate the logic so as to determine the devices in a network by reading their internal descriptions and tables, for example as defined in RFC 1213.

This invention exploits the notion that software performs much processing without the need for complex condition and exception handling. Such instructions generally have little relevance to the context of the environment in which the software is running. As a result, the instructions that do most of this processing comparatively require little change and maintenance. Therefore, these instructions are compiled into machine code.

However, there are typically some instructions that test and depend on the environment of the software. These instructions are best coded in scripts and interpreted at the time of execution. This facilitates easy understanding and change of the instructions that are most affected by changes and peculiarities in the environment.

The current software industry conservatively spends at least 80% of available resources in software maintenance. By placing the tests and conditions that depend heavily on the dynamic environment into an easily understood scripting language the maintainers of software can quickly locate and change portions of code when required. This eliminates the need of recompilation of software for every new exception encountered, which is the standard practice of the current software industry. This solution may greatly impact the productivity in software development.

In the field of network management, due to the poor enforcement of a network management standard, namely the Simple Network Management Protocol (SNMP), non-compliance with the SNMP standard is very common in network devices. It is virtually impossible to include all the exceptions at the time of software release. Our implementation of this invention uses a generic API to process all the exceptions. Although known and unknown exceptions are always very device or environment specific, they are always processed using the same generic API. This API is the interface between the compiled code and the interpreted scripts.

Tests and conditions that are specified in script instructions allow for ease of multitasking. Scripting instructions that are running inside an interpreter or virtual machine (VM), along with the state information about the execution of the script, are collectively called a thread. When the script needs to test for an external environment condition, the thread simply exits in a suspended mode while internally maintaining the state of the thread of execution. The compiled code can then perform other tasks until the requested information becomes available to the thread. At this point, the machine code reactivates the script thread and execution resumes.

The implementation of this invention has been tested extensively and proven in both simulation and practice. This invention has been applied to solve the problem of discovering the nodes in communications networks. This invention enormously simplified the solution, since only 10k lines of code are required, including compiled code and scripts; known currently available systems require 100k lines of code. This invention also provide massive parallelism, as each node is investigated in parallel, rather than one by one. This parallelism provides for far more rapid discovery, with a time frame of the order 10 minutes when using this invention in a large 3000 node network, rather than the several hours required by known systems.

DESCRIPTION OF THE PREFERRED EMBODIMENTS

The following description is not intended to describe the scope of the invention. It is intended only to illustrate an example in which the invention is presently employed.

In a typical example, in pseudocode, the algorithm used in the discovery of network elements on a TCP/IP network is as follows.

```
get local IP address;
get local netmask;
compute range of local IP addresses and add to ip_list;
foreach addr in ip_list
{
    send ICMP echo request to addr;
    if ICMP echo response from addr
    {
        add addr to node_list;
    }
}
foreach addr in node_list
{
    start VM using script jaywalk on addr;
}
while true
{
    [ mathematical and topology generation instructions continue here ]
    schedule execution of VMs in round robin sequence;
}
```

From the current IP address and netmask of the computer that the algorithm is running, a range of addresses to query is inferred. These addresses are queried using the ICMP echo request protocol.

If a machine at the IP address responds to the ICMP echo request, then its address is added to a another list for further interrogation.

The next step in the algorithm exploits the current invention. Rather than attempting to determine the characteristics of the device inside the main body of code, a virtual machine is started, using the query address as a parameter. The heuristics of the decision making process used to determine the identity of the device, which is heavily dependent on the environment, is left to the script running inside the VM.

The VM starts a script called "jaywalk", the series of tests coded in the scripting language, on each address found in the local network. After the VMs are started, other code can continue executing.

We claim:

1. A method of operating a computer comprising:
   a) providing a compiled code;
   b) providing logic in the compiled code that causes it to seek to perform an operation for which no compiled code is provided;
   c) providing a plurality of segments of interpreted code, each segment being adapted to perform a different environment handling operation;
   d) invoking said interpreted code by an API to perform said different environment handling operations; and
   e) returning the result of said operation to said compiled code,
   f) the environment handling operations being performed by constructing models of exceptions in the environment within the interpreted code.

2. A method as defined in claim 1 in which said compiled and interpreted code are stored in a memory, and in which the method is carried out by means of at least one CPU which interfaces said memory.

* * * * *